Figure 1:
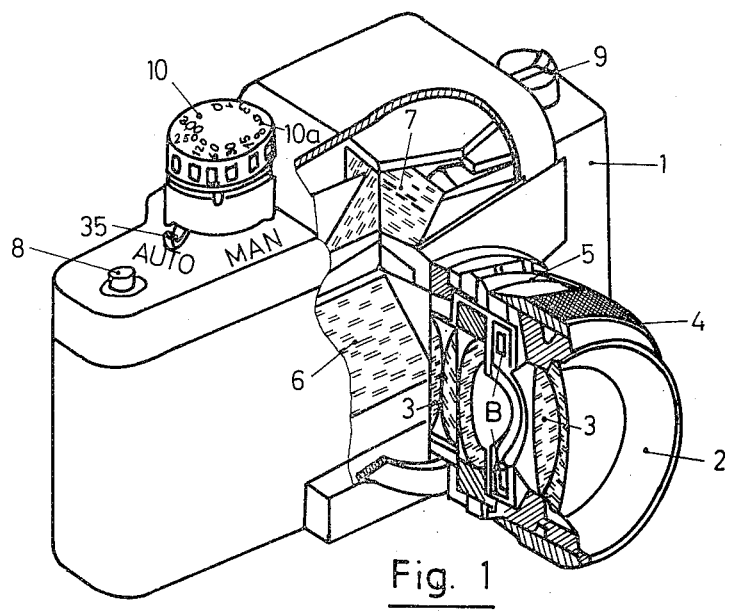

United States Patent [19]

Starp

[11] 4,327,977
[45] May 4, 1982

[54] FRICTIONALLY CONTROLLED PHOTOGRAPHIC CAMERA APPARATUS SUCH AS A REFLEX CAMERA

[76] Inventor: Franz Starp, Mittlere Steige 36, 7547 Wildbad 5, Fed. Rep. of Germany

[21] Appl. No.: 226,275

[22] Filed: Jan. 19, 1981

[30] Foreign Application Priority Data

Jan. 19, 1980 [DE] Fed. Rep. of Germany ....... 3001915

[51] Int. Cl.³ .............................................. G03B 7/14
[52] U.S. Cl. ..................................... 354/29; 354/230; 354/252; 354/256; 354/271
[58] Field of Search .................... 354/26, 29, 30, 226, 354/228, 229, 230, 237, 238, 241, 242, 245–249, 250, 252, 256, 271

[56] References Cited

U.S. PATENT DOCUMENTS

| | | | |
|---|---|---|---|
| 3,820,131 | 6/1974 | Tanaka | 354/247 |
| 3,847,476 | 11/1974 | Onda et al. | 354/252 |
| 3,852,786 | 12/1974 | Onda et al. | 354/252 |
| 3,871,012 | 3/1975 | Haraguchi | 354/252 |
| 3,872,488 | 3/1975 | Oshima | 354/246 |
| 3,956,761 | 5/1976 | Koch et al. | 354/252 |
| 3,973,269 | 8/1976 | Koch et al. | 354/252 |
| 4,054,892 | 10/1977 | Nakagawa et al. | 354/252 |

*Primary Examiner*—Russell E. Adams
*Attorney, Agent, or Firm*—Arthur A. March

[57] ABSTRACT

Photographic camera such as a reflex camera, of the type having at least one automatic region in which the diaphragm blades of a diaphragm blade aperture system, incorporated in the objective lens arrangement connected, e.g. in front of a light sensitive element for sensing ambient light, are adjustable from an initial position corresponding to the smallest diaphragm aperture width to a diaphragm aperture width adequate for the prevailing light conditions, in dependence upon such sensed ambient light, by means of a driving member or driving ring of an energizable driving system for the diaphragm blade aperture system which is energizable with electrical current pulses, e.g. via an electronic control circuit, in a continuous progressive adjustment movement, such that the continuous progressive adjustment movement of the diaphragm blades is effected under the continuous sliding frictional contact resistance of a spring loaded friction brake acting against the driving member for the diaphragm blades and securing the driving member simultaneously in the corresponding adjustment end position attained, e.g. in dependence upon such sensed ambient light, and which friction brake at the end of the camera exposure operation, i.e. after taking the photograph, is temporarily disengageable electromagnetically from its operative frictional contact position to permit the delay free, i.e. frictional contact free, return of the diaphragm blades back to the initial position thereof.

10 Claims, 5 Drawing Figures

FRICTIONALLY CONTROLLED PHOTOGRAPHIC CAMERA APPARATUS SUCH AS A REFLEX CAMERA

The present invention relates to a photographic camera, more especially a reflex camera, having at least one automatic region in which the blades of a diaphragm blade system incorporated in the objective lens arrangement, connected for instance in front of a light-sensitive element, proceed from an initial or basic position having the smallest diaphragm aperture and are adjustable to an aperture width, adequate for the prevailing light conditions, by the action of the driving part of an electrodynamic driving system therefor which is energizable with current pulses, e.g. an appropriate electronic control circuit.

In conventional cameras of the aforesaid general type having an electrodynamically drivable diaphragm blade mechanism, it may occur that the diaphragm blades, on account of the kinetic energy imparted thereto and to the further parts of the diaphragm mechanism, come to a stop at a point which does not exactly agree with the nominal value ascertained by the associated computer of the appropriate electronic control circuit and with the corresponding stop signal terminating the current supply to the electrodynamically drivable mechanical drive for the diaphragm mechanism. This in turn may lead to deviations in the actual diaphragm aperture width attained and a corresponding lack of accuracy for this exposure parameter.

Moreover, it is recognized that in conventional cameras of said type the adjusted setting position of the diaphragm blades obtained, based solely on the termination of the current supply to the electrodynamic drive, provides only an inadequate safeguard against deviations therefrom due to possible mechanical vibrations emanating from associated camera drives, for example, the reflex drive which is operated before beginning the actual film exposure.

Although a more adequate safeguard might possibly contemplate the precaution of providing a ratchet mechanism or the like to secure the diaphragm mechanism in the adjusted setting position once it has been actually attained so as to prevent deviations caused by subsequent mechanical vibrations, this would not remedy the lack of accuracy which may be introduced during the setting operation. This is because such a ratchet mechanism would not be effective during the diaphragm setting adjustment and hence will be unable to influence the acceleration behavior of the diaphragm system itself during this time.

Additionally, diaphragm setting or regulating devices are already known in which a pawl is provided which, on a switching command, e.g from a control circuit, engages in a tooth segment participating in the opening movement of the diaphragm system and thereby stops further movement of the blades. While in this type device arrangement the blades are adequately secured in the setting position once attained, the requirements for a truly adequate and accurate light setting of the diaphragm are not, since these can only be insured by continuous or infinite adjustment, whereas the engagement of the pawl with the tooth segment permits only a discontinuous or stepped diaphragm setting to be achieved. Also, it will be appreciated that between the switching command and the actual engagement of the pawl with the tooth segment a parallel time axis or mechanical time delay prevails. This known type diaphragm setting device therefore as seen from the basic concept of accuracy of the diaphragm setting suffers from an inherent lack of achieving definite adjustment accuracy for this exposure parameter.

In view of the knowledge of this disadvantage, a diaphragm setting device for a twin blade diaphragm has been suggested which differs fundamentally from the aforesaid pawl and tooth segment control device only by the fact that in place of a pawl a friction brake acting vertically on the diaphragm blades is used instead. However, with this known twin blade diaphragm control accurate adjustability of the diaphragm blades is likewise questionable due to the fact that a time parallel axis or mechanical time delay also exists in this case, i.e. between the switching command for the brake and the actual engagement of the brake for stopping further movement of the diaphragm blades.

Since the diaphragm blades of this friction brake device arrangement are essentially free and therefore run off relatively rapidly, and must be suddenly caught by the friction brake, a condition exists which is problematic in that its fulfillment for a stop action is based exclusively on delay time-dependent triggered frictional engagement. Overshoot and hence deviations from the desired light dependent nominal value will therefore be inevitable in using this known friction brake type diaphragm setting device. Moreover, the difficulty of achieving reproducibility in diaphragm adjustments is added thereto, since the braking distance of the blades once the friction brake becomes effective is dependent upon various further parameters, not necessarily constant, such as mechanical pressure application force of the friction member of the brake on the diaphragm blades, and the frictional coefficient of the diaphragm blades themselves.

It is among the objects and advantages of the present invention to avoid the drawbacks and deficiencies of the pertinent prior art, such as that noted above, especially in terms of the adverse effect on the exposure result of a camera attributable to known diaphragm setting devices, and to provide a photographic camera apparatus, such as a reflex camera, having a diaphragm blade aperture system in which the aperture width actually attained during adjustment agrees accurately and reproducibly with the desired nominal value, e.g. ascertained by the computer of an appropriate electronic control circuit and fed into the driving system, and in which the diaphragm blades are securely retained in their adjusted position upon reaching the desired aperture width, until the end of the exposure operation of the camera.

Figure 2:
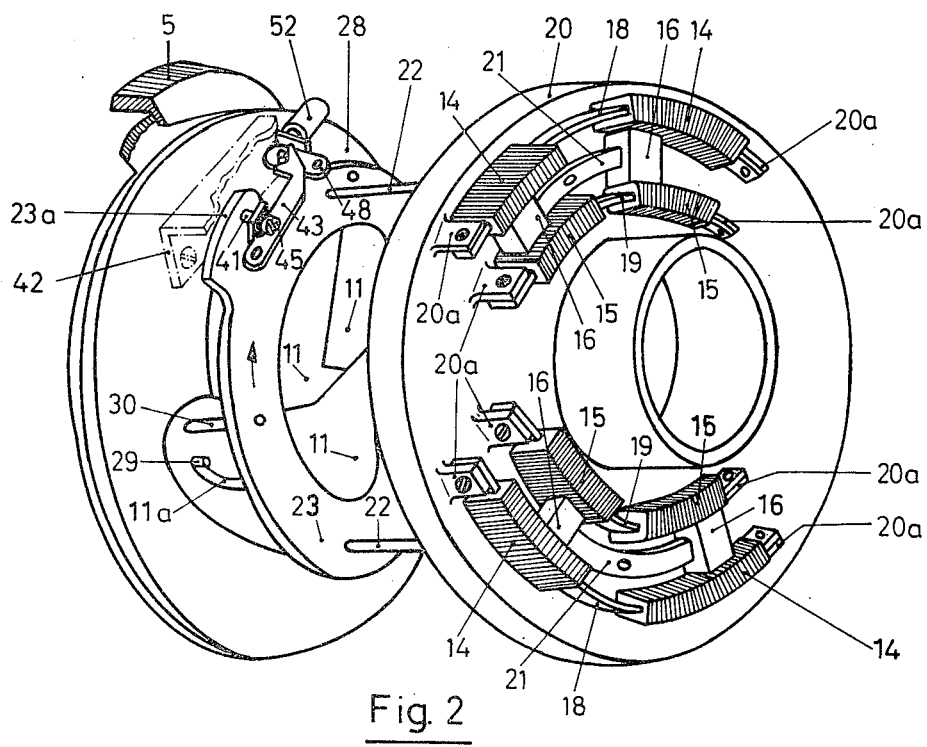
Figure 3:
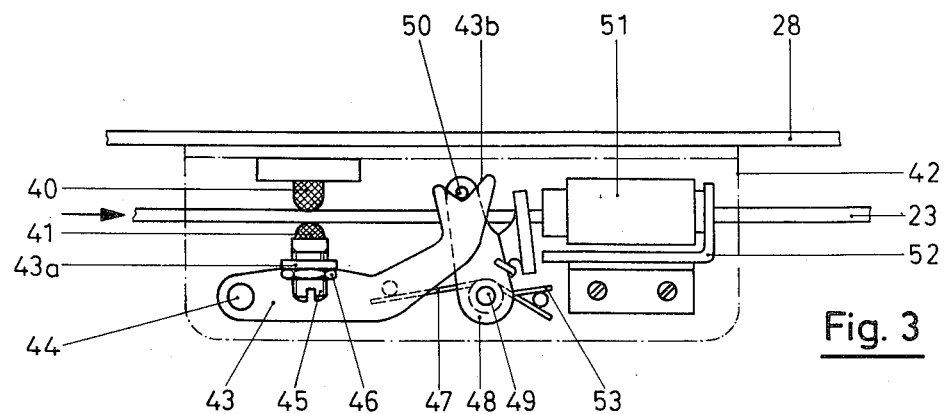
Figure 4:
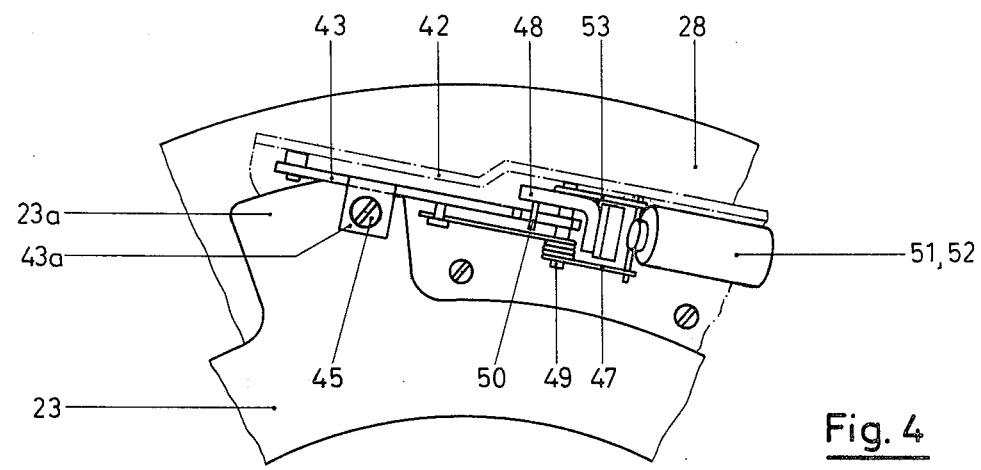
Figure 5:
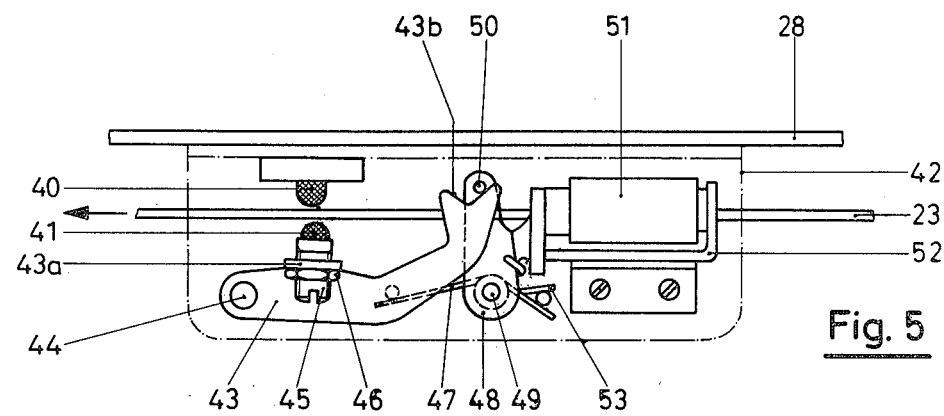

Other and further objects and advantages of the present invention will become apparent from a study of the within specification and accompanying drawings, in which:

FIG. 1 is a schematic perspective view of a single lens reflex camera having an objective lens arrangement which is shown in longitudinal section, FIG. 2 is a schematic perspective and exploded view of the camera of FIG. 1 showing the diaphragm blade system located in the objective housing and which is electrodynamically drivable and adapted to be metered or controlled by a friction brake, FIG. 3 is a schematic top view showing the friction brake of FIG. 2 in operative position influencing the driving member of the diaphragm blade system, FIG. 4 is a schematic side view of the arrangement of FIG. 3, and FIG. 5 is a schematic view similar to FIG. 3 but showing the friction brake in inoperative position with its brake shoes eased away from the driving member.

According to the present invention, a photographic camera, more especially a reflex camera, is provided, e.g. of the type having at least one automatic region in which the blades of a diaphragm system, incorporated in the objective lens which is connected for instance in front of a light sensitive element, upon preceeding from an initial or basic position corresponding to the smallest diaphragm aperture width, are adjustable to an aperture width adequate for the prevailing light conditions by means of the driving member of a driving system energizable with current pulses, e.g via an electronic control circuit, in a continuous progressive switching or adjustment movement.

The continuous progressive adjustment movement of the diaphragm blades is advantageously carried out against the resistance of a spring-loaded friction brake continuously acting on the driving member for the blades and securing it simultaneously in the adjustment end position attained, and which is disengageable electromagnetically from such operative continuously frictionally active position only at the end of the exposure operation of the camera to permit the delay-free return of the diaphragm blades back to the initial or basic position.

In this manner, the proportion of the driving energy, which would otherwise result in an overswing of the blade system, is efficiently absorbed by a resistance value corresponding to the friction brake which is adequate for the attendant acceleration components, thereby achieving a controlled acceleration thereof and insuring that after the stopping of the blade system adjustment movement, owing to the continuous maintenance of the friction brake effect on the blade system, such blade system also retains unchanged its adjustment end position or setting position.

The present arrangement is inherently also energy conserving in nature in that the friction brake in the continuous sliding frictional contact position or operational position may advantageously preferably abut against the driving member to be braked under desirable spring force which need be eased only for returning the diaphragm blades to their initial or basic position.

To enable attendant pull-out torques and bending stresses based on unilateral force loading to be kept away from the driving member of the diaphragm blade system in a simple manner, it is desirable that the friction brake preferably have correspondingly opposed cooperating shoes located on both sides of the driving member, one such shoe being secured to a fixed part forming an abutment and the other such shoe being secured to a rotatably located part maintained under pre-tension by a spring and which may be electromagnetically actuated.

A particular advantage of this arrangement, moreover, resides in the fact that even using a relatively low spring force for counteracting the displaceable armature or anchor lever of an electromagnet for operating the friction brake for temporarily disengaging such brake from frictional contact with the driving member, the opening movement of the driving member for attaining the desired adjustment end position may be opposed with a sufficient frictional resistance operatively based thereon, so as to assure a uniform movement cycle.

An actuating device for temporarily disengaging the friction brake, which possesses a favorable structural conception and which operationally is particularly functionally reliable, may be attained by use of a control cam formed on the rotatably located part of the brake in operative association with a control pin mounted on the displaceable armature or rotatably mounted anchor lever of the electromagnet in such a manner that, with the energizing of the electromagnet, the rotatable part is temporarily displaceable from the friction contact position or operational position against the force loading of the spring operatively engaging thereon.

Preferably, the brake shoes of the friction brake are made of appropriate friction possessing plastic material and their corresponding pressure surfaces are formed in each case as a spherical surface for enhanced efficiency.

Since the braking force emanating from the friction brake, which is operatively directed opposite to the driving force for attaining the opening movement of the diaphragm blades from the initial position, must not exceed a certain operative order of magnitude, or else such opening movement will not be able to occur, as the artisan will appreciate, adjustment means in the form of an adjusting screw or the like may be preferably provided which permit a sensitive adjustability of the braking effect to be carried out to assure proper operation.

From a technological manufacturing point of view, a substantial simplification of the assembly of the friction brake may be attained in that the appropriate parts may be premounted as a more or less self-contained unit on a supporting plate together with the diaphragm system, so as to be adapted to be installed as a complete structural group into the objective housing arrangement of the camera.

Referring to the drawing, and initially to FIG. 1, the housing 1 of a single lens reflex camera is shown which is fitted with a focal plane shutter (not shown) and with an objective lens housing or arrangement 2, in which besides lenses 3, an electrodynamically drivable diaphragm blade system B is arranged. Moreover, the objective arrangement 2 is provided with a manual focal distance setting ring 4 serving as a focussing ring and range-finder, and a further manual diaphragm aperture setting ring 5 serving exclusively for the manual pre-adjustment of the aperture of the diaphragm blade system.

Also, a reflex mirror or swinging mirror 6 is located in the camera housing 1, as well as a pentaprism viewfinder 7, plus the shutter release button 8, the film take-up spool 9 and the shutter speed or exposure time setting dial 10 for the focal plane shutter of the camera.

Further discussion of the known structural details of the various elements of such a reflex camera, including a conventional photo-electric sensor or light sensitive element such as an ambient light responsive photodiode (not shown) for metering, associated with a conventional electronic control circuit (not shown) for effecting the usual camera operations, may be dispensed with since they are not absolutely necessary to an understanding of the pertinent elements of the present invention or their operation.

As noted above, for actuating the diaphragm blade system, which for example, may be formed of three or more diaphragm blades 11, an electrodynamic drive is provided in the objective housing 2 which, as shown in FIG. 2, includes operatively opposed magnetic coils 14 and 15 associated in pairs with each other and reciprocally rotatably mounted permanent magnets 16 cooperating with each such pair of coils.

While the magnetic coils 14 and 15 are wound on magnetic contact segments 18 and 19 fixedly secured to projections 20a of a stationary electrodynamic drive accommodating base plate 20, the corresponding permanent magnets 16 are each mounted on supports 21 which by means of the associated, e.g. coaxially extending, pins 22 are maintained in fixed driving connection with the reciprocally rotatable driving member 23 for the diaphragm blades 11. For this purpose, the pins 22 are passed through arcuate slots (not shown) machined in the stationary base plate 20.

As will be appreciated, in place of two electrodynamic driving systems of the stated type, it is also possible where the force requirement is otherwise considered adequate for the desired purposes, to use only one such diaphragm blade driving system B. In this event, the second such driving system may be employed advantageously as an independent system to drive an opening and closing interlens shutter system (not shown) which may be incorporated in the objective housing 2 in addition to or in place of the focal plane shutter.

In this regard, a diaphragm blade segment combination in which the diaphragm blades are initially displaceable in a first movement phase at low run-off speed for determining the diaphragm aperture width prior to the opening movement of the shutter exposure blade system, and following the beginning of the opening movement of the shutter exposure blade system with timed spacing corresponding to the preset exposure time, thence subsequently displaceable in a second movement phase at high run-off speed for closing the objective aperture in the manner of a closing shutter operation, has been described in detail in German DOS No. 28 27 857.1 and its counterpart U.S. application Ser. No. 52,281 filed June 26, 1979, now U.S. Pat. No. 4,227,792 issued Oct. 14, 1980 (Waldemar Rentschler), both with respect to structure and mode of operation. The factors that have been stressed as important and significant therein for the mode of operation of the diaphragm blade system equally apply to the diaphragm blade system B arrangement of the present invention.

As further shown in FIG. 2, a stationary diaphragm blade guiding base plate 28 is also arranged in the objective housing 2, which is provided with several fixed pins 28 engaging in slots 11a of the diaphragm blades 11 in the usual manner. The geometric shape and course of the slots 11a is chosen so that diaphragm blades 11, by means of a corresponding further pin 30 in driving connection with the driving member 23 are moved out of their initial position in accordance with the opening of the aperture as soon as the driving member 23 is actuated by the corresponding electrodynamic drive system 14 to 20, whereby the driving member 23 executes a rotary movement in the direction of the arrow indicated in FIG. 2.

This is always the case when the corresponding magnetic coils 14 and 15 are supplied in conventional manner with electric current pulses from the appropriate associated control circuit (not shown) in a definite direction, whereas on reversal of the direction of flow of such current in the magnetic coils 14 and 15, the associated permanent magnets 16 are moved in the opposite direction, whereupon the driving member 23 and the diaphragm blades 11 return to the previously assumed initial position, as the artisan will appreciate.

As further shown in FIG. 1, the camera, besides being provided with the exposure time setting dial 10 and the diaphragm preselector setting member or ring 5, is also provided with a mode selector 35 adjustable in conventional manner to the mode "MAN" and the mode "AUTO".

In this regard, in the mode "MAN" the diaphragm aperture width may be determined by an electromagnetically actuatable path defining stop (not shown) terminating the runoff movement of the driving members 23 of the diaphragm system B sooner or later in accordance with the disclosure of applicant's German Patent Application No. P 29 51 006.3 and its counterpart U.S. application Ser. No. 217,900 filed Dec. 18, 1980 (Franz Starp).

On the other hand, the width of the diaphragm aperture during setting of the camera to the mode "AUTO" may be adjusted automatically by a sensor, e.g. photodiode, located in the circuit of an appropriate conventional electronic control circuit associated with the arrangement and situated behind the objective lens arrangement of the camera, in accordance with the amount of light incident on such sensor, in the usual way.

Thus, the driving member 23 of the diaphragm system B, by means of one or both of the corresponding electrodynamic driving systems 14 to 20 as used, as the case may be, is progressively moved, starting from an initial or basic position, by energizing the magnetic coils 14 and 15 with current pulses until the current to the coils is terminated via a return command from the electronic control circuit in dependence upon the ambient light sensed by the associated light sensor or photodiode, whereby the member 23 and therewith the associated diaphragm system B stops at an aperture width corresponding to the prevailing light intensity in the usual way.

In a camera having a diaphragm control device of the kind referred to above, in order to obtain accurate diaphragm settings adequate for the ambient lighting, it is necessary to insure that the diaphragm mechanism, without time parallax or mechanical time delay, abruptly terminates its run-off movement at the instant at which the conventional electronic control circuit issues the switching command thereto, i.e. it is necessary to prevent the progressively moving diaphragm blades 11, due to constant acceleration, from reaching an angular speed which could result in an overswing correspondingly beyond the adjusted diaphragm nominal value actually desired.

This may be remedied in a simple manner in accordance with the present invention by the use of a constantly acting friction brake for influencing the driving member 23 during the opening movement of the diaphragm blades 11, and which is appropriately temporarily released from such constant acting friction braking influence on the driving member only for closing the exposure aperture exposed by the focal plane shutter or other appropriate shutter means employed, whereupon the diaphragm blades 11 may rapidly return from the hitherto assumed aperture setting position back to the initial position unhindered by such friction brake.

The friction brake as such may be formed, as shown in the embodiment of FIGS. 3 to 5, from operatively opposed elements such as brake shoes 40 and 41 which are correspondingly located on both sides of the driving member 23 and act and have a restraining influence on the movement course of such reciprocally rotatable driving member as soon as the brake shoes 40 and 41 are operatively caused to abut against a brake disc extension 23a formed, e.g. radially outwardly, along a peripheral or circumferential portion of the driving member 23 or secured thereto.

While the brake shoe 40 is fixedly mounted on a stationary supporting plate 42, preferably of angular shape, indicated in the drawings only by chain-dotted lines, and which is fixedly attached to stationary supporting plate 28, the brake shoe 41 is mounted on a one-armed lever 43 which, by means of a fixed pivot pin 44 on supporting plate 42, is rotatably mounted relative to the supporting plate 42. For the purpose of securing the brake shoe 41 in place, a lug 43a or the like is formed on the one-armed brake lever 43 serving to receive an adjustment setting screw 45 which in turn may be secured by means of a lock nut 46 in the setting position assumed.

It is evident, especially from FIGS. 3 to 5 of the drawings, that the brake shoe 41 is operatively inserted in the adjacent end of the setting screw 45, and projects from its end face, for which purpose the screw 45 has a correspondingly sized and arranged concentric bore.

Both the movable brake shoe 41 and the stationary brake shoe 40 are made preferably of a plastic material of a conventional kind which, upon abutting against an appropriate counter surface such as a metal surface, is distinguished by favorable friction drive or high friction coefficient properties. To facilitate the slidability of the driving member 23 relative to the brake shoes 40 and 41 when gripping the driving member therebetween, it is preferred to fashion the thrust surfaces of the brake shoes 40 and 41 as appropriate spherical surfaces.

An electromagnetically attractable anchor lever 48 cooperates with the one-armed brake lever 43 subject to the action of a pressure application spring 47 normally urging the brake lever in a direction which causes the movable brake shoe 41 to engage frictionally with the driving member 23 at its brake disc 23a. The anchor lever 48 is rotatably mounted on the supporting plate 42 by means of a fixed pivot pin 49, and is furthermore provided with a control pin 50 appropriately positioned at its free end and which in turn is associated with a control cam 43b formed on the free end of the brake lever 43. The development of the control cam 43b and the association of the control pin 50 therewith is such that the spring-loaded brake shoe 41, as shown in FIG. 3, normally constantly abuts against the brake disc 23a of the driving member 23 under the force of the spring 47, when the coil 51 of the associated electromagnet 52 is not energized, while a further spring 53 pushes the anchor lever 48 away from the electromagnet and towards the brake lever 43 so as not to interfere with the spring-loaded braking action of the brake shoe 41. However, when the electromagnet 52 is energized, e.g. by the appropriate electronic control circuit (not shown) associated with the arrangement in conventional manner, the anchor lever 48 is attracted, whereby the control pin 50 acting on the control cam 43b moves the brake lever 43 into inactive or brake releasing position as shown in FIG. 5. In this inactive or inoperative adjustment position, the brake shoes 40 and 41 are released temporarily from frictional gripping contact with the brake disc 23a of the driving member 23, and hence the driving member 23 for the diaphragm blades is released for an unhindered delay-free and frictional contact free return movement to achieve the initial position of the diaphragm blades.

Of particular importance is the use of the above-described diaphragm control device having a friction brake of the instant type in a photographic camera in which, in accordance with the disclosure in said German DOS No. 28 27 857.1 and its counterpart U.S. application Ser. No. 52,281 filed June 26, 1979, now U.S. Pat. No. 4,227,792 issued Oct. 14, 1980 (Waldemar Rentschler), as aforesaid the diaphragm blades in a first movement phase are driven at a low run-off speed and in a second movement phase, i.e. following the beginning of the opening movement of a focal shutter or central shutter, are run-off at high speed, for the purpose of rapid closure of the lens passage.

Moreover, the diaphragm control device having a friction brake according to the present invention, is not limited to use in reflex cameras having a focal plane shutter, since as the artisan will appreciate it may also be used for instance in reflex cameras which has an objective arrangement mountable thereon, which besides the electrodynamically drivable diaphragm system additionally has a central interlens shutter driven in the same manner.

As will be appreciated by the artisan, an electronic control circuit of the conventional type, electrically energized in the usual manner, e.g. by a battery or the like (not shown), for controlling the exposure parameters "time" and "aperture" of the camera as provided with such "MAN" and "AUTO" modes (cf. FIG. 1), may be advantageously included in accordance with the electronic control circuit arrangement as disclosed and described in applicant's said German Patent Application No. P 29 51 006.3 and its counterpart U.S. application Ser. No. 217,900 filed Dec. 18, 1980 (Franz Starp).

In this regard, the setting devices 10 and 35, for effecting correspondingly the presetting of the exposure parameter "time" and the selection of the operational mode "MAN" or "AUTO" are connected by means of respective current conductive leads to a conventional microcomputer, which appropriately stores all the commands for the exposure function of the camera and evaluates these in a computing process in the usual manner. The data fed from both setting devices 10 and 35 are communicated electrically to the microcomputer as a resistance value or a switching pulse in conventional manner.

Likewise, via an appropriate current conductive lead, the preset value at a further film speed setting member (not shown) for the film speed of the film being used may also be communicated to the microcomputer in the usual way.

Also, a light sensitive element such as a photodiode (not shown) for sensing ambient light is connected by means of a further current conducting lead to the non-inverting input of an operational amplifier, which acts as a photo-current amplifier and informs the microcomputer of the electrical data via an output current conductive lead, in conventional manner.

The microcomputer also has an output current conductive lead which is connected to two switches, and via these two switches, the magnetic coils 14 and 15 of the two electrodynamic driving systems 14 to 20 for the diaphragm blades 11 (cf. FIG. 2), are supplied with current in the normal manner. For this purpose, one such electrodynamic driving system is connected via a further current conductive lead to one such switch and the other such electrodynamic driving system is connected via a further current conductive lead to the other such switch.

Finally, it is also necessary to mention the electromagnet 52 for actuating the anchor lever 48 for temporarily disengaging the friction brake by conjointly displacing the brake lever 43 (cf. FIGS. 2 to 5), which electromagnet on command of the electronic control circuit is energized via further appropriate current conductive lead and switch operatively connected with the microcomputer, all in a manner analogous to the operative connection with the microcomputer of the lead and switch to the electromagnet for actuating the path limiting stop via the anchor lever in accordance with the constructional arrangement shown in the drawings and disclosed and described in applicant's said German Patent Application No. P 29 51 006.3 and its counterpart U.S. application Ser. No. 217,900 filed Dec. 18, 1980 (Franz Starp).

As pertinent hereto, at the appropriate point in the automatic region operation for preparing the camera for the exposure operation when taking a photograph, i.e. after pressing the shutter release button 8, the two electrodynamic driving systems 14 to 20 are correspondingly energized by the electronic control circuit for continuous progressive adjustment movement of the driving member 23 for automatically adjusting in turn the diaphragm blades 11 from an initial position corresponding to the smallest aperture width to an adjustment end position corresponding to an aperture width adjusted in dependence upon sensed ambient light, all under the continuous sliding frictional contact resistance of the friction brake 40, 41 urged against the driving member by the spring 47. When the adjustment end position of the driving member 23 and in turn of the diaphragm blades 11 is reached, the electrodynamic driving systems 14 to 20 are correspondingly automatically deenergized by the electronic control circuit, and the friction brake 40, 41 remains in braking contact with the driving member 23 simultaneously automatically thereby securing the driving member and in turn the diaphragm blades in the corresponding reproducibly selected adjustment end position until the photograph is taken.

Thereafter, the electronic control circuit temporarily energizes the electromagnet 52 to cause the anchor lever 48 to be attracted thereto and in turn the displacement of the brake lever 43 away from frictional contact with the driving member 23 and against the biasing force of the spring 47. This is immediately followed by the energizing of the two electrodynamic driving systems 14 to 20 in the opposite direction for achieving the return of the driving member to its initial position in an unhindered, delay free manner, i.e. in a frictional contact free return movement of the driving member under the driving influence of the electrodynamic driving systems. Upon reaching the initial position, the electronic control circuit automatically deenergizes the electromagnet 52, thereby immediately causing the spring urged friction brake 40, 41 to reapply itself automatically against the driving member 23, after which the two electrodynamic driving systems 14 to 20 are again deenergized, so that the process for taking of the next photograph can begin.

Advantageously, therefore, the present invention contemplates a photographic camera apparatus, such as a reflex camera, of the type adapted to contain a light sensitive element such as a photodiode for sensing ambient light, and having at least one automatic region of camera operation adapted to be controlled by an electronic control circuit in dependence upon sensed ambient light, comprising objective means incorporating an electrically energizable diaphragm aperture blade system including a driving member and diaphragm blades, the camera apparatus being adapted to contain such light sensitive element behind the diaphragm blades, the driving member being operatively arranged for continuous progressive adjustment movement for automatically adjusting in turn the diaphragm blades from an initial position corresponding to the smallest aperture width to an adjustment end position corresponding to an aperture width adjusted in dependence upon sensed ambient light, and an electromagnetically disengageable spring loaded friction brake.

The friction brake is operatively arranged in normally continuous resiliently urged sliding frictional contact with the driving member and responsive to electromagnetic actuation for temporarily disengaging the friction brake from such frictional contact, whereby the continuous progressive adjustment movement of the driving member is effected under the continuous sliding frictional contact resistance of the friction brake acting thereon and the driving member is simultaneously secured thereby automatically in the corresponding adjustment end position for the taking of a photograph, and thereafter the friction brake is temporarily electromagnetically disengageable from such frictional contact with the driving member for operatively energized frictional contact free return movement of the driving member and in turn of the diaphragm blades to the initial position thereof for the next continuous progressive adjustment movement for taking the next photograph.

More specifically, the friction brake includes a pair of brake shoes correspondingly located on opposed sides of the driving member, one such shoe being secured to a fixed part operatively forming an abutment and the other such shoe being secured to a rotatably mounted and electromagnetically actuatable part operatively subjected to the spring load of a biasing spring for maintaining said sliding frictional contact with the driving member.

Preferably, the rotatably mounted part is formed as a displaceable friction brake lever having a control cam provided thereon, and an energizable electromagnet and a cooperating anchor lever or armature lever are provided, the anchor lever being operatively arranged for displacement in response to energization of the electromagnet and having a control pin mounted thereon in operative engagement with the control cam for displacing the brake lever against the operative spring load of the biasing spring upon energization of the electromagnet for temporarily disengaging the friction brake from said sliding frictional contact with the driving member.

Desirably, the brake shoes are made of plastic material having enhanced friction possessing characteristics, and their corresponding frictional contact surfaces are formed as spherical surfaces.

Suitably, adjustable setting means are provided for adjustably setting the operative spring load of the friction brake.

The friction brake may optionally be mounted in advantageous manner on a base plate for incorporation as a complete structural unit in the objective means or lens housing.

According to a broad aspect of the present invention, a photographic camera apparatus may be provided, comprising diaphragm system driving means operatively arranged for adjustment movement from an initial position to an adjustment position, and disengageable friction brake means operatively disengageably arranged in normally continuous resiliently urged sliding frictional contact with the driving means in any position of the driving means for continuously frictionally controlling the movement of the driving means and simultaneously thereby frictionally securing the driving means in the corresponding adjustment position thereof and temporarily disengageable from such frictional contact with the driving member for frictional contact free return movement of the driving means from the adjustment position to the initial position thereof.

More particularly, the photographic camera apparatus, such as a reflex camera, may comprise a diaphragm system driving member operatively arranged for electrically energized adjustment movement and adapted to be driven in a continuous progressive adjustment movement operation from an initial position to an adjustment end position selectable in dependence upon sensed ambient light for taking a photograph in accordance with such sensed ambient light and adapted for adjusting in turn a diaphragm aperture blade system, i.e. from a corresponding initial position at which the diaphragm aperture is provided with the smallest aperture width to a corresponding adjustment end position at which the diaphragm aperture is provided with an aperture width in accordance with such sensed ambient light, a friction brake operatively disengageably arranged in normally continuous resiliently urged sliding frictional contact with the driving member in any position of the driving member for continuously frictionally controlling the movement of the driving member during the continuous progressive adjustment movement operation thereof and simultaneously thereby frictionally securing the driving member in the corresponding adjustment end position thereof for the taking of a photograph, and electrically energizable disengaging means.

Advantageously, such disengaging means are operatively arranged for temporarily disengaging the friction brake from such frictional contact with the driving member for operatively energized frictional contact free return movement of the driving member from the adjustment end position to the initial position thereof for the next continuous progressive adjustment movement operation for taking the next photograph.

Preferably, the disengaging means include electromagnetic means, the driving member has opposed lateral sides, and the friction brake includes a pair of opposed cooperating brake shoes respectively located adjacent the opposed sides of the driving member. In this regard, one such shoe is operatively arranged on a fixed abutment part and disposed closely adjacent one side of the driving member, and the other such shoe is operatively arranged on a rotatably mounted and electromagnetically actuatable part responsive to the electromagnetic means and maintained in normally continuous resiliently urged sliding frictional contact with the other side of the driving member under a resilient force sufficient to cause the driving member to be urged correspondingly in simultaneous sliding frictional contact at such one side thereof with such one shoe.

More particularly, the rotatably mounted part may be formed as a rotatably displaceable friction brake lever having a control cam provided thereon, and the electromagnetic means may include a stationary electromagnet and a displaceably mounted anchor lever responsive to the electromagnet for relative movement thereof toward and away from the electromagnet and having a control pin thereon in operative engagement with the control cam for correspondingly rotatably displacing the brake lever to disengage the shoe thereon from said sliding frictional contact with the corresponding side of the driving member upon movement of the anchor lever. Additionally, spring means may be selectively adjustably provided for operatively normally continuously resiliently urging the shoe on the brake lever into said sliding frictional contact with the corresponding side of the driving member under a selectively adjustable spring force.

It will be appreciated that the foregoing specification and accompanying drawings are set forth by way of illustration and not limitation, and that various modifications and changes may be made therein without departing from the spirit and scope of the present invention which is to be limited solely by the scope of the appended claims.

What is claimed is:

1. Photographic camera apparatus, such as a reflex camera, of the type adapted to contain a light sensitive element for sensing ambient light, and having at least one automatic region of camera operation adapted to be controlled by an electronic control circuit in dependence upon sensed ambient light, comprising objective means incorporating an electrically energizable diaphragm aperture blade system including a driving member and diaphragm blades, the camera apparatus being adapted to contain such light sensitive element behind the diaphragm blades, the driving member being operatively arranged for continuous progressive adjustment movement for automatically adjusting in turn the diaphragm blades from an initial position corresponding to the smallest aperture width to an adjustment end position corresponding to an aperture width adjusted in dependence upon sensed ambient light, and an electromagnetically disengageable spring loaded friction brake operatively arranged in normally continuous resiliently urged sliding frictional contact with the driving member and responsive to electromagnetic actuation for temporarily disengaging the friction brake from such frictional contact, whereby the continuous progressive adjustment movement of the driving member is effected under the continuous sliding frictional contact resistance of the friction brake acting thereon and the driving member is simultaneously secured thereby in the corresponding adjustment end position for the taking of a photograph, and thereafter the friction brake is temporarily electromagnetically disengageable from such frictional contact with the driving member for operatively energized frictional contact free return movement of the driving member and in turn of the diaphragm blades to the initial position thereof for the next continuous progressive adjustment movement for taking the next photograph.

2. Apparatus according to claim 1 wherein the friction brake includes a pair of shoes correspondingly located on opposed sides of the driving member, one such shoe being secured to a fixed part operatively forming an abutment and the other such shoe being secured to a rotatably mounted and electromagnetically actuatable part operatively subjected to the spring load of a biasing spring for maintaining said sliding frictional contact with the driving member.

3. Apparatus according to claim 2 wherein the rotatably mounted part is formed as a displaceable friction brake lever having a control cam provided thereon, and an energizable electromagnet and a cooperating anchor lever are provided, the anchor lever being operatively arranged for displacement in response to energization of the electromagnet and having a control pin mounted thereon in operative engagement with the control cam for displacing the brake lever against the operative spring load of the biasing spring upon energization of the electromagnet for temporarily disengaging the friction brake from said sliding frictional contact with the driving member.

4. Apparatus according to claim 1 wherein the brake shoes are made of plastic material and their corresponding frictional contact surfaces are formed as spherical surfaces.

5. Apparatus according to claim 1 wherein adjustable setting means are provided for adjustably setting the operative spring load of the friction brake.

6. Apparatus according to claim 1 wherein the friction brake is mounted on a base plate for incorporation as a complete structural unit in the objective means.

7. Photographic camera apparatus comprising
diaphragm system driving means operatively arranged for adjustment movement from an initial position to an adjustment position, and
disengageable friction brake means operatively disengageably arranged in normally continuous resiliently urged sliding frictional contact with the driving means in any position of the driving means for continuously frictionally controlling the movement of the driving means and simultaneously thereby frictionally securing the driving means in the corresponding adjustment position thereof and temporarily disengageable from such frictional contact with the driving means for frictional contact free return movement of the driving means from the adjustment position to the initial position thereof.

8. Photographic camera apparatus, such as a reflex camera, comprising
a diaphragm system driving member operatively arranged for electrically energized adjustment movement and adapted to be driven in a continuous progressive adjustment movement operation from an initial position to an adjustment end position selectable in dependence upon sensed ambient light for taking a photograph in accordance with such sensed ambient light and adapted for adjusting in turn a diaphragm aperture blade system,
a friction brake operatively disengageably arranged in normally continuous resiliently urged sliding frictional contact with the driving member in any position of the driving member for continuously frictionally controlling the movement of the driving member during the continuous progressive adjustment movement operation thereof and simultaneously thereby frictionally securing the driving member in the corresponding adjustment end position thereof for the taking of a photograph, and
electrically energizable disengaging means operatively arranged for temporarily disengaging the friction brake from such frictional contact with the driving member for operatively energized frictional contact free return movement of the driving member from the adjustment end position to the initial position thereof for the next continuous progressive adjustment movement operation for taking the next photograph.

9. Apparatus according to claim 8 wherein the disengaging means include electromagnetic means, the driving member has opposed lateral sides, and the friction brake includes a pair of opposed cooperating brake shoes respectively located adjacent the opposed sides of the driving member, one such shoe being operatively arranged on a fixed abutment part and disposed closely adjacent one side of the driving member, and the other such shoe being operatively arranged on a rotatably mounted and electromagnetically actuatable part responsive to the electromagnetic means and maintained in normally continuous resiliently urged sliding frictional contact with the other side of the driving member under a resilient force sufficient to cause the driving member to be urged correspondingly in simultaneous sliding frictional contact at such one side thereof with such one shoe.

10. Apparatus according to claim 9 wherein the rotatably mounted part is formed as a rotatably displaceable friction brake lever having a control cam provided thereon, and the electromagnetic means include a stationary electromagnet and a displaceably mounted anchor lever responsive to the electromagnet for relative movement thereof toward and away from the electromagnet and having a control pin thereon in operative engagement with the control cam for correspondingly rotatably displacing the brake lever to disengage the shoe thereon from such sliding frictional contact with the corresponding side of the driving member upon movement of the anchor lever, and spring means are selectively adjustably provided for operatively normally continuously resiliently urging the shoe on the brake lever into said sliding frictional contact with the corresponding side of the driving member under a selectively adjustable spring force.

* * * * *